United States Patent
Efstathiou et al.

(10) Patent No.: US 8,282,975 B2
(45) Date of Patent: Oct. 9, 2012

(54) SOFT FROZEN LIQUID EGG PRODUCT

(75) Inventors: John D. Efstathiou, Plymouth, MN (US); Matthew Van Natter, Monticello, MN (US); Michael Saunders, St. Louis Park, MN (US); Noah M. Atlas, St. Louis Park, MN (US)

(73) Assignee: Cargill, Incorporated, Wayzata, MN (US)

( * ) Notice: Subject to any disclaimer, the term of this patent is extended or adjusted under 35 U.S.C. 154(b) by 940 days.

(21) Appl. No.: 12/059,264

(22) Filed: Mar. 31, 2008

(65) Prior Publication Data

US 2009/0246334 A1  Oct. 1, 2009

(51) Int. Cl.
*A23B 5/00* (2006.01)

(52) U.S. Cl. ..................... 426/330.1; 426/330

(58) Field of Classification Search ............... 426/330.1
See application file for complete search history.

(56) References Cited

U.S. PATENT DOCUMENTS

| | | | |
|---|---|---|---|
| 2,114,195 A | 4/1938 | Teichner | |
| 2,142,510 A | 1/1939 | Harris et al. | |
| 3,565,638 A | 2/1971 | Ziegler et al. | |
| 4,244,976 A | 1/1981 | Kahn | |
| 4,409,249 A * | 10/1983 | Forkner | 426/100 |
| 5,266,338 A * | 11/1993 | Cascione et al. | 426/32 |
| 5,283,072 A * | 2/1994 | Cox et al. | 426/312 |
| 2003/0012859 A1* | 1/2003 | Efstathiou | 426/614 |

FOREIGN PATENT DOCUMENTS

| | | |
|---|---|---|
| JP | 51-54951 | 5/1976 |
| JP | 55-120741 | 9/1980 |
| JP | 60-118143 | 6/1985 |
| JP | 63-263040 | 10/1988 |
| JP | 07-23703 | 1/1995 |
| JP | 2001-252050 | 9/2001 |
| JP | 2001-346508 | 12/2001 |
| JP | 2008-61 | 1/2008 |
| JP | 2008-307014 | 12/2008 |
| RU | 1777767 | 11/1992 |
| SU | 715617 A * | 1/1980 |
| SU | 1183794 A * | 10/1985 |

OTHER PUBLICATIONS

International Search Report from corresponding PCT/US2009/001747, mailed Sep. 22, 2009, 3 pages.

* cited by examiner

*Primary Examiner* — Jyoti Chawla

(57) ABSTRACT

The present disclosure relates to a soft frozen liquid egg product including liquid egg, and at least one of incorporated air amount and at least one functional ingredient; wherein the soft frozen liquid egg product comprises a temperature ranging from about −25° F. to about 31° F. prior to heating. Methods of making the soft frozen liquid egg product are also disclosed. The soft frozen liquid egg product can be used to make various food products. Methods of making various food products comprising the disclosed soft frozen liquid egg product are also disclosed.

13 Claims, No Drawings

SOFT FROZEN LIQUID EGG PRODUCT

DESCRIPTION OF THE DISCLOSURE

1. Field of the Disclosure

The present disclosure relates to a soft frozen liquid egg product that has been formulated and/or processed in a manner that allows the final product to be scooped, spread, portioned, or processed when the product is in a temperature ranging from about −25 to about 31° F., prior to heating. Methods of making the soft frozen liquid egg product are also disclosed. The soft frozen liquid egg product can be used to make various food products. Methods of making various food products comprising the disclosed soft frozen liquid egg product are also disclosed.

2. Background of the Disclosure

Current preparations of egg products include the use of shell eggs, liquid refrigerated egg products, frozen liquid egg products, fully cooked frozen products, and refrigerated egg products. Many finished egg dishes are single serving applications such as omelets, patties, or scrambled eggs. Each of these finished egg dishes are produced by using small portions of the aforementioned packaged egg products. Larger restaurants often utilize refrigerated liquid or frozen liquid egg products to prepare egg portions. Because of the large volume and speed of service utilized by larger food establishments the whole container of product will be used in a relatively short amount of time. However, liquid egg products must either be refrigerated, where the product takes up valuable refrigerator space, or frozen. Frozen liquid eggs require either an elongated time for preparation from the frozen state, or the product must first be thawed to a refrigeration temperature before cooking to form the finished egg product.

Similarly, preparation of soufflés in restaurant or home applications requires that the soufflé batter be prepared just prior to baking, utilizing specific equipment and technique to ensure proper preparation to achieve the correct texture and air incorporation. Soufflés also require additional preparation time in addition to storage or thawing of liquid egg products including separation of egg whites, measuring of additional ingredients, and cooking.

Situations where a carton, pail, or bag of liquid eggs is opened, but the entire amount of product cannot be used leads to waste. Furthermore, the food safety concerns that accompany the use of shell eggs to meet the needs of small batch cooking/baking, and the shelf life concerns that accompany opened cartons, pails, or bags of liquid eggs need to be overcome.

Moreover, restaurant preparation of French toast uses a liquid egg as a dip for the bread. The liquid egg portion may drip off the bread resulting in a loss of product, or may contaminate the surrounding area.

Through formulation and processing techniques, the applicants have been able to overcome at least one of the problems discussed above. In particular, the disclosed egg products can address each various desirable property within a single product, rather than multiple products to meet multiple needs.

SUMMARY OF THE DISCLOSURE

In accordance with the disclosure, there is disclosed a soft frozen liquid egg product comprising liquid egg; and at least one of incorporated air amount and at least one functional ingredient; wherein the soft frozen liquid egg product comprises a temperature ranging from about −25° F. to about 31° F. prior to heating.

There is also disclosed a method of making a soft frozen liquid egg product comprising combining liquid egg, and at least one of incorporated air amount and at least one functional ingredient; and freezing the combination at a temperature ranging from about 16° F. to about 31° F.

In another aspect, there is also disclosed a method of making a soft frozen liquid egg product comprising at a first stage, combining liquid egg, and at least one of incorporated air amount and at least one functional ingredient; and freezing the combination at a temperature ranging from about 16° F. to about 31° F.; and at a second stage, freezing the soft frozen liquid egg at a temperature ranging from about 15° F. to about −25° F.

Moreover, in an aspect, there is disclosed a method of making a food product comprising heating to a selected temperature a soft frozen liquid egg product comprising: liquid egg, and at least one of incorporated air amount and at least one functional ingredient; wherein the soft frozen liquid egg product comprises a temperature ranging from about −25 to about 31° F. prior to heating.

Further, there is disclosed a kit comprising a first container comprising a soft frozen liquid egg product comprising: liquid egg, and at least one of incorporated air amount and at least one functional ingredient; wherein the soft frozen liquid egg product has a temperature ranging from about −25 to about 31° F.; and a second container comprising at least one optional ingredient selected from the group consisting of salts, buffers, sugar, starch, water, thickening agents, milk products, edible oils, flavors, acidifying agents, polyols, chelating agents, meat products, vegetables, sugar, baking ingredients, finished baked goods, sauces, confectioneries, and antimicrobial agents.

Additional objects and advantages of the disclosure will be set forth in part in the description which follows, and can be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

DESCRIPTION OF THE EMBODIMENTS

The present disclosure relates to soft frozen liquid egg products. Soft frozen liquid egg products can comprise a liquid egg product, and at least one of incorporated air amount and at least one functional ingredient, wherein the soft frozen liquid egg product comprises a temperature ranging from about −25 to about 31° F., prior to heating. As used herein "soft frozen" is understood to mean a "liquid" that has been cooled to a point where portions have crystallized and are mixed throughout the liquid, creating a texture more firm than the liquid, yet more soft than a solid product. Non-limiting examples of liquid as used in the disclosed context would be water, liquid egg, milk, etc. The soft frozen liquid egg products can have varying degrees of firmness. For example, an egg product at the lower end of the disclosed temperature range would be firmer and hence more rigid than an egg product at the higher end of the disclosed temperature range, which would be less firm and can slowly over time fill a container into which it is placed.

The soft frozen liquid egg product can comprise at least one functional ingredient to aid in softening of the soft frozen liquid egg product. Non-limiting examples of such ingredients include: various salts (e.g., sodium chloride, sodium acid pyrophosphate (SAPP) and/or monosodium phosphate (MSP)), thickening agents (e.g., hydrocolloids), polyols (e.g., glycerol, erythritol, etc.), edible oils (e.g., soybean oil, corn oil, etc.), and sugar.

The egg product at the lower end of the temperature range can be described as being "scoopable," i.e., able to be scooped out of a container due to the softened nature of the product in its frozen form. In an aspect, a scoopable egg product can have a temperature ranging from about 15° F. to about −25° F. Moreover, a soft frozen liquid egg product at the higher end of the temperature range can be described as having a "soft-serve" consistency and can be dispensed from a soft-serve ice cream machine in a soft frozen form or otherwise readily portioned. In an aspect, a soft-serve egg product can have a temperature ranging from about 16° F. to about 31° F.

The disclosed soft frozen liquid egg products can also be easily measured to control portion sizes thereby yielding only the amount needed for that serving with little to no waste. Moreover, the disclosed soft frozen liquid egg products can resist the growth of bacteria and other organisms, making the product more robust for a longer period of storage when compared to refrigerated liquid egg or other further processed egg products currently used in the industry.

The disclosed soft frozen liquid egg products can be prepared with whole eggs, egg whites, egg yolks, mixtures thereof, and/or concentrated egg products. In an aspect, the starting materials can be liquid.

"Whole egg" means a mixture of egg white and yolk. The whole egg may, but does not necessarily, include egg white and egg yolk in a ratio recognized as the ratio of yolk to white in eggshells. Whole egg products can include other optional ingredients disclosed below.

"Egg white" means egg white obtained after separating the white and the yolk by breaking fresh eggs, and as such, the egg white is substantially free of egg yolk. The egg white can be used in the disclosed products that can comprise other optional ingredients as described below.

"Egg yolk" means egg yolk obtained after separating the white and the yolk by breaking fresh eggs, and as such, the egg yolk is substantially free of egg white. The egg yolk can be used in the disclosed products that can comprise other optional ingredients as described below.

"Liquid egg product" means liquid whole egg, liquid egg white, liquid egg yolk or any combination of the above along with any other ingredients defined herein, but not limited to ingredients listed below.

The disclosed soft frozen liquid egg products can be prepared in a commercially available barrel type freezer. In a first stage of the process, the liquid whole egg product and at least one of incorporated air amount and at least one functional ingredient can be frozen to a temperature ranging from about 16° F. to about 31° F. After this first stage of the process, the soft frozen liquid egg product can have a soft-serve consistency, as discussed above. The soft frozen liquid egg product can then be portioned, processed into a food product, or further processed as discussed below.

After the first stage of the process, the frozen whole egg can then be packed into a container. In the second stage of the process, the packed soft frozen liquid egg product can be further frozen to a temperature ranging from about 15° F. to about −25° F. After this second stage of the process, the soft frozen liquid egg product can be scoopable, as discussed above. The soft frozen liquid egg product can then be portioned or processed into a food product.

In an aspect, air can be incorporated into the soft frozen liquid egg product at any stage of the processing, such as at a first stage. One of ordinary skill in the art would understand that the amount of air can be regulated and that the amount is variable depending upon the resultant application of the soft frozen liquid egg product. The addition of air to the soft frozen liquid egg product can enhance the scoopability of the egg product. Moreover, the incorporation of air can provide texture, as discussed in more detail below. In an aspect, the overrun can be in a range of from about 1 to about 150% percent. The calculation of overrun in the soft frozen liquid egg product can be determined as follows:

$$\text{Overrun}(\%) = \frac{\text{Wt of mix} - \text{wt of product}}{\text{Wt of product}} \times 100$$

The disclosed liquid egg products used to produce soft frozen liquid egg products can be pasteurized with or without additional ingredients and then frozen, blended and/or heated to form various food products. The order of the freezing and blending can be varied depending upon the desired soft frozen liquid egg product.

The liquid egg product used to produce soft frozen liquid egg products can be pasteurized in a manner consistent with the International Egg Pasteurization Manual (Froning, G. W., et. al, United Egg Association, Alpharetta, Ga., 2002), the disclosure of which is hereby incorporated by reference. Typically, the liquid egg product can be pasteurized to reduce the number of viable microbes initially present in the liquid egg product.

As discussed above, the soft frozen liquid egg product can further comprise optional ingredients to form a food product. Non-limiting examples of such optional ingredients include, starch (e.g., cornstarch), water, milk products (e.g., butter milk and/or nonfat milk, cheeses, such as cheddar, provolone, feta), flavors (e.g., butter, pepper, egg, and/or MSG), acidifying agents (e.g., citric acid to achieve a pH of about 6.7 to about 6.8), chelating agents (e.g., EDTA), meat products (e.g., diced meats, cured meats, sausage, ham, and/or bacon), vegetables (e.g., tomatoes, peppers, onions, etc.), baking ingredients (e.g., baking powder, baking soda, flour, unsweetened cocoa, etc.) or finished baked goods, sauces, nuts, confectionaries and antimicrobial agents (e.g., nisin). As an example, the disclosed food product can be a blended egg omelet with a select mix of vegetables and cured meats.

Both optional and functional ingredients can be blended with the soft frozen liquid egg product before and/or after the liquid egg product used for producing the soft frozen liquid egg product is subjected to pasteurizing, or even with raw egg used for making soft frozen liquid egg product. For example, the liquid egg product can be blended with milk, citric acid, salt, flavors, and stabilizer before pasteurization. In an aspect, the pasteurized, liquid egg product can then be frozen in an ice-cream type rotator freezer barrel or through the use of other freezing technologies. The soft frozen egg product can be blended when the mix attains a soft-serve consistency, with additional optional ingredients, such as vegetables (e.g., diced tomatoes, peppers, onions, etc.) diced cured meats (e.g., sausage, ham and/or bacon), select-diced cheeses (e.g., cheddar, provolone and/or feta), sweet inclusions (e.g. chocolate chips, candy, etc.), flavors, powders, sauce inclusions, fruit particulates and/or nuts. The soft frozen liquid egg product can then be further frozen to a temperature ranging from about −25° F. to 31° F., for example from about −20° F. to about 25° F., and as a further example from about −10° F. to about 10° F.

In an aspect, the soft frozen liquid egg product can be placed into a freezer and held until use. Keeping the product frozen, instead of holding the product at a refrigerated state to thaw before cooking, reduces the potential for growth of spoilage and pathogenic organisms, making the product more food safe and robust. For example, the soft frozen liquid egg product can be placed into a bulk container, such as a large plastic bucket for storage in the freezer. It can be expected that the product quality of the soft frozen liquid egg product can be maintained the same time as frozen ice cream (e.g. 6 months to 1 year or longer) provided that the product is maintained in proper storage conditions and temperatures.

For at least these reasons, the disclosed egg product can be at various stages of solidity depending upon several factors, including, but not limited to the temperature at a given time, how much air is in the egg product, and any optional and/or functional ingredients present in the egg product.

The soft frozen liquid egg product can be heated to produce various food products. In particular, the soft frozen liquid egg product can be scooped out of a container, or optionally dispensed from a soft-serve ice cream machine, in easy measurable portions still in the frozen state from 16 to 31° F., then applied directly to a heating element (e.g., pan, griddle, microwave, etc.) for production of various food products, such as omelets, scrambled eggs, French toast, soufflés, and/or other egg products. During heating, the soft frozen liquid egg product can also be blended with optional ingredients.

The heating time and temperature for the soft frozen liquid egg product can readily be determined by one of ordinary skill in the art. In particular, the time and temperature are dependent upon several factors including, but not limited to, the type of carrier or receptacle the egg product is placed in for heating, the type of food product being made, the type of heating source, etc. Non-limiting examples of a heating source include an oven, a convection oven, a microwave, a griddle, a stove (gas or electric), and the like.

In an aspect, a pre-portioned amount of the soft frozen liquid egg product can be placed onto a carrier or into a receptacle prior to heating. The carrier can be any item used to hold the egg product, such as a plate or an edible carrier, for example, a piece of bread, cracker, tortilla, or cookie. Moreover, the receptacle can be any item used to hold the egg product, such as a ceramic ramekin or a paper cup. As a non-limiting example, the egg product can be spread directly onto a bread carrier, while the egg is still in its frozen form and then cooked either in a microwave or other heating device to produce a fully cooked French toast.

Advantages of using the disclosed soft frozen liquid egg product can include at least one of reduced preparation time, reduced risk of cross contamination with bacteria and other organisms, portion control, control of distribution of the egg, less loss due to dripping of liquid egg, such as traditionally utilized in preparation of French toast, no need for thawing a soft frozen liquid egg product, and rapid production time. The French toast can also be frozen after applying the soft frozen liquid egg to a bread carrier and held until heating is desired.

Moreover, air may be integrated during the freezing process providing texturing similar to ice cream over-run. A soufflé prepared with the disclosed soft frozen liquid egg product will benefit from the air incorporation by rising during cooking providing a product with a souffled appearance and texture after cooking. The finished soufflé can be served in the cooking container, or removed from the cooking container and served on a separate serving apparatus.

In an aspect, the disclosed soft frozen liquid egg product can be used to make a sandwich, wherein the soft frozen liquid egg product can be placed into the sandwich. It is understood that a "sandwich" can be at least two slices of any edible carrier, such as those described above, with the disclosed soft frozen liquid egg product between the at least two slices. The sandwich can be assembled with a soft frozen liquid egg product, without thawing, or a previously assembled sandwich can be taken directly out of the freezer (without thawing), and cooked rapidly into a servable finished product. The entire sandwich, prior to heating, can be frozen with the soft frozen liquid egg product within. The frozen sandwich can be held in a frozen form until use. Before serving, the sandwich can then be heated (such as in a microwave oven or other heating device) then served. The soft frozen liquid egg product starts to solidify during the heating process to form an irregularly shaped egg omelet or patty that can or can not extend outside the sandwich. Additionally, the egg portion in the sandwich can act to hold components of the finished cooked sandwich together.

In an aspect, there is disclosed a kit comprising a first container comprising a soft frozen liquid egg product comprising liquid egg and at least one of incorporated air amount and at least one functional ingredient; wherein the soft frozen liquid egg product has a temperature ranging from about −25° F. to about 31° F. prior to heating; and a second container comprising at least one optional ingredient selected from the group consisting of salts, buffers, sugar, starch, water, thickening agents, milk products, edible oils, flavors, acidifying agents, polyols, chelating agents, meat products, vegetables, sugar, baking ingredients, finished baked goods, sauces, confectioneries, and antimicrobial agents.

EXAMPLES

It is intended that the examples are being presented for the purpose of illustration only and are not intended to limit the scope of the invention disclosed herein. As would be understood by one of ordinary skill in the art, the particular ingredients employed and the concentrations of the ingredients can differ from those used in the examples.

Example 1

Soft Frozen Liquid Egg Product

Various compositions of soft frozen liquid egg products were prepared, as shown below in the tables, frozen to a soft-serve ice cream consistency, such as from about 16° F. to about 31° F. and hardened at various temperatures ranging from about −25° F. to about 15° F. in a freezer. The compositions were checked at various intervals from 18 hours to 2 weeks for freezing and found acceptable and returned to the freezer and held until use.

| Composition 1 (Comp. 1)- | | |
|---|---|---|
| Soft frozen liquid egg w/increased polyol | Formula (g) | Percentage |
| Whole Egg | 753.5 | 75.35 |
| Functional Ingredients* | 222 | 22.20 |
| Optional Ingredients** | 24.5 | 2.45 |
| Total | 1000 | 100.00 |

*Edible oil, polyol, salts
**Acidifying agent, thickening agent, milk powder and flavor

| Composition 2 (Comp. 2) | | |
|---|---|---|
| Soft frozen liquid egg w/ flour as a soufflé mix | Formula (g) | Percentage |
| Whole Egg | 713.5 | 71.35 |
| Functional Ingredients* | 212 | 21.20 |
| Optional Ingredients** | 74.5 | 7.45 |
| Total | 1000 | 100.00 |

*Edible oil, polyol, salts
**Acidifying agent, thickening agent, baking ingredient milk powder, and flavor

| Composition 3 (Comp. 3) | | |
|---|---|---|
| Soft frozen liquid egg - as a base for particulate inclusion | Formula (g) | Percentage |
| Whole Egg | 763.5 | 76.35 |
| Functional Ingredients* | 212 | 21.20 |
| Optional Ingredients** | 24.5 | 2.45 |
| Total | 1000 | 100.00 |

*Edible oil, polyol, salt
**Acidifying agent, thickening agent, milk powder, and flavor

| Composition 4 (Comp. 4)- | | |
|---|---|---|
| Composition 3 with optional ingredients | Formula (g) | Percentage |
| Egg Blend (composition 1) | 300 | 74.08 |
| Sausage | 45 | 11.11 |
| Onions | 30 | 7.41 |
| Green Peppers | 15 | 3.70 |
| Red Peppers | 15 | 3.70 |
| Total | 405 | 100.00 |

| Composition 5 (Comp. 5) | | |
|---|---|---|
| Chocolate Soufflé for stand alone application or particulate inclusion | Formula (g) | Percentage |
| Whole Egg | 528.5 | 52.85 |
| Functional Ingredients* | 372 | 37.20 |
| Optional Ingredients** | 99.5 | 9.95 |
| Total | 1000 | 100.00 |

*Edible oil, sugar, polyol, salt
**Acidifying agent, thickening agent, baking ingredient, milk powder, and flavor Example 2

Soufflé

Samples were microwaved both in ceramic ramekins and paper ice-cream pints until there was no presence of liquid left on the cooked samples.

Both Comp. 3 and Comp. 1 samples cooked with a similar soufflé height in both the ramekins and paper pint containers. However, after removing the soufflés from their containers, it was noted that the soufflés produced in ceramic ramekins had only a small lower portion (that which was cooked inside the ramekin) that did not extend to the bottom of the container, even though the mix was originally placed in the bottom of the container. The paper containers yielded a soufflé with a lower portion that extended fully to the bottom of the container for each sample.

The testing was repeated with Comp. 2, Comp. 4, and a chocolate formula similar to Comp. 5. Similar testing with ceramic ramekins and paper pint containers resulted in the same effect with all formulas. Additionally, Comp. 2 did not rise as high and fell almost immediately after being touched. However, the chocolate (similar formula to Comp. 5) performed well, having the highest peaks and best texture after microwaving and the particulate added formula (Comp. 4) performed well, although the peak of the soufflé did not rise as high as the Comp. 3 and Comp. 1 samples.

Comp. 1 and Comp. 5 using a bread carrier in the bottom of the paper container, as well as with a bread carrier on the top and the bottom of the soft frozen liquid egg product was tested. Comp. 1 samples used a piece of wheat bread for both the bottom only and bottom and top tests, while Comp. 5 used sweet bread for the bottom only test and peanut butter cookies for the bottom and top test. The bread carrier when placed on the bottom seemed to improve the height and texture of the soufflé, over that without a bread carrier. The bottom and top testing yielded a much more dense texture in both cases, yet Comp. 1 samples were very light and fluffy textured, while the Comp. 5 samples were more of the consistency of a chewy brownie.

Samples of Comp. 1 and Comp. 5 were also cooked in a convection oven, to determine the ability to create a soufflé. While Comp. 1 had excessive browning, both Comp. 1 and 5 did soufflé. It was noted that the soufflé effect was greater in a paper container, while the ramekin produced a denser product for both formulas.

Example 3

Frozen Puck in Frozen Sandwich

Pre-portioned amounts of soft frozen liquid egg product were made approximately ¼ inch thick, with a diameter the same size as an English muffin. A sandwich was put together with the portioned egg positioned between a piece of meat and a slice of cheese inside two English muffin halves, with all components being frozen at the time of assembly.

The sandwich was wrapped in a paper towel, and microwaved for a minute. The sandwich was removed after 1 minute and opened immediately. The entire sandwich was heated, with the egg portion being entirely cooked, though some of the cooked egg appeared to have dripped over the edge of the meat and the bottom English muffin and cooked on those surfaces, adhering to them.

Another sandwich sample was created with the same frozen ingredients, however this time the soft frozen liquid egg product was created with a diameter of approximately ¼ inch thickness and a diameter approximately ½ inch smaller than the diameter of the English muffin halves. The sandwich was again microwaved as described above. The egg portion this time formed an irregular shaped appearance within the sandwich, which was not flowing over the outside edges of the bottom ingredients. The egg was adhered slightly to the cheese and meat, but was identifiable as an egg component.

Example 4

French Toast

Samples of soft frozen liquid egg product were applied in their frozen form to bread carriers using a knife and cooked using receptor packaging. The bread carriers were then placed into a microwave. Bread and buns were spread with both Comp. 5 and Comp. 2 and cooked using the microwave, cooking with the egg on the susceptor film and with the egg facing away from the susceptor film. The egg was cooked on the bread, with limited absorption into the bread, and cooking time could control the amount of browning.

Samples of bread were prepared with soft frozen liquid egg product the same as described above. However, the bread was cooked in a pan on a stovetop. Again, the bread had limited absorption of the egg. The browning was also controlled with cook time.

Example 5

Desert Cookie Sandwich

Soft frozen liquid egg product formulated into a chocolate soufflé mix (Comp. 5) was scooped from a container utilizing an ice cream scoop, directly after being removed from a freezer set at approximately −15° F. The soft frozen chocolate soufflé mix scoop was deposited on top of a cookie that was cut to fit the diameter at the bottom of a paper container, which had been placed into the bottom of the paper container. Once the scoop was deposited, another cookie, cut to fit the paper container, was placed gently on top of the scoop of chocolate soufflé mix (Comp. 5). The container with the cookies and soufflé mix were placed into the microwave and cooked sufficiently to fully cook the soufflé portion. Upon removal from the microwave, the container was inverted over a plate to dislodge the cooked product.

The cooked product yielded a desert cookie sandwich, having cookies on the bottom and top with the chocolate soufflé mix cooked to a dense consistency between the cookies. The texture of the soufflé portion was similar to that of a brownie, with some air pockets.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a meat" includes two or more different meats. As used herein, the term "include" and its grammatical variants are intended to be non-limiting, such that recitation of items in a list is not to the exclusion of other like items that can be substituted or added to the listed items.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method of making a soft frozen whole egg product comprising:
   combining liquid whole egg and a functional ingredient to form a mixture, wherein the liquid whole egg includes egg white and egg yolk in a ratio recognized as the ratio of yolk to white in eggshells and the functional ingredient is selected from the group consisting of salts, sugar, thickening agents, polyols, and edible oils;
   pasteurizing the mixture; and
   incorporating air into the mixture at an overrun of 1% to 150% while freezing the mixture at a temperature ranging from about 16° F. to about 31° F. to form a soft frozen whole egg product that can be scooped or spread, and heated without thaw.

2. The method of claim 1, further comprising blending at least one optional ingredient with the soft frozen whole egg product before, during, or after freezing.

3. The method of claim 1, further comprising blending at least one optional ingredient with the soft frozen whole egg product after freezing.

4. The method of claim 1, further comprising blending at least one optional ingredient with the soft frozen whole egg product prior to pasteurizing.

5. The method of claim 1, further comprising freezing the soft frozen whole egg product, at a second stage, at a temperature ranging from about 15° F. to about −25° F.

6. The method of claim 5, further comprising blending at least one optional ingredient with the soft frozen whole egg product before, during, or after freezing.

7. The method of claim 5, further comprising blending at least one optional ingredient with the soft frozen whole egg product after freezing.

8. The method of claim 5, further comprising blending at least one optional ingredient with the soft frozen whole egg product prior to pasteurizing.

9. A method of making a food product comprising:
   combining a functional ingredient into liquid whole egg, wherein the functional ingredient is selected from the group consisting of salts, sugar, thickening agents, polyols, and edible oils and the liquid whole egg includes egg white and egg yolk in a ratio recognized as the ratio of yolk to white in eggshells;
   pasteurizing the combined liquid whole egg and functional ingredient;
   combining air into said pasteurized liquid whole egg and functional ingredient at an overrun of 1% to 150% while freezing the combined liquid whole egg and functional ingredient at a temperature from about −25° F. to about 31° F. to form a soft frozen whole egg product that can be scooped or spread; and
   heating to a selected temperature said soft frozen whole egg product without thaw prior to said heating.

10. The method of claim 9, wherein the soft frozen whole egg product is placed on a carrier before or during heating.

11. The method of claim 9, wherein the soft frozen whole egg product is placed in a receptacle before or during heating.

12. The method of claim 9 wherein the soft frozen whole egg product is placed without thaw on an edible carrier prior to heating.

13. The method of claim 9 wherein the soft frozen whole egg product is placed directly onto a bread carrier while the egg product is still in its frozen form, and then cooked to produce a fully cooked French toast.

* * * * *

UNITED STATES PATENT AND TRADEMARK OFFICE
CERTIFICATE OF CORRECTION

| | | |
|---|---|---|
| PATENT NO. | : 8,282,975 B2 | Page 1 of 1 |
| APPLICATION NO. | : 12/059264 | |
| DATED | : October 9, 2012 | |
| INVENTOR(S) | : John D. Efstathiou et al. | |

It is certified that error appears in the above-identified patent and that said Letters Patent is hereby corrected as shown below:

On the Cover Page, in column 2, under "FOREIGN PATENT DOCUMENTS", line 10, delete "RU" and insert -- SU --, therefor.

In column 10, line 58, in claim 12, delete "claim 9" and insert -- claim 9, --, therefor.

In column 10, line 61, in claim 13, delete "claim 9" and insert -- claim 9, --, therefor.

Signed and Sealed this
Eighteenth Day of December, 2012

David J. Kappos
*Director of the United States Patent and Trademark Office*